(12) United States Patent
Hulse et al.

(10) Patent No.: US 6,550,952 B1
(45) Date of Patent: Apr. 22, 2003

(54) OPTICAL WAVEGUIDE ILLUMINATION AND SIGNAGE DEVICE AND METHOD FOR MAKING SAME

(75) Inventors: George Robert Hulse, Cookeville, TN (US); Cory Alan Smith, McMinnville, TN (US); Mark Joseph Cleaver, Wilmette, IL (US)

(73) Assignee: Ilight Technologies, Inc., Evanston, IL (US)

( * ) Notice: Subject to any disclaimer, the term of this patent is extended or adjusted under 35 U.S.C. 154(b) by 0 days.

(21) Appl. No.: 09/844,212

(22) Filed: Apr. 27, 2001

Related U.S. Application Data

(60) Provisional application No. 60/250,722, filed on Dec. 1, 2000, provisional application No. 60/229,018, filed on Aug. 30, 2000, and provisional application No. 60/200,411, filed on Apr. 28, 2000.

(51) Int. Cl.[7] .................................................. F21V 7/04
(52) U.S. Cl. ........................ 362/555; 362/560; 40/547; 382/901
(58) Field of Search ................................. 362/555, 559, 362/812, 560, 335, 336; 40/547; 385/128, 901, 124

(56) References Cited

U.S. PATENT DOCUMENTS

| 5,678,334 A | * 10/1997 | Schoniger ............... 40/446 |
| 5,879,076 A | 3/1999 | Cross |
| 6,123,442 A | * 9/2000 | Freier et al. ............ 362/559 |
| 6,146,006 A | 11/2000 | Cross |
| 6,267,492 B1 | * 7/2001 | Reid et al. ............. 362/287 |

* cited by examiner

Primary Examiner—Alan Cariaso
Assistant Examiner—Ali Alavi
(74) Attorney, Agent, or Firm—Stites & Harrison, PLLC; Vance A. Smith; David W. Nagle, Jr.

(57) ABSTRACT

An illuminating device comprising an optical waveguide having at least one set of LEDs positioned adjacent one end surface and having a portion of the surface area treated so as to cause a portion of the light directed along the length of the waveguide to be reflected out of the waveguide through a second surface area located intermediate the length of the waveguide. Indicia may be located within the treated portion of the surface area so as to be illuminated and made visible to a viewer through the second surface area.

28 Claims, 15 Drawing Sheets

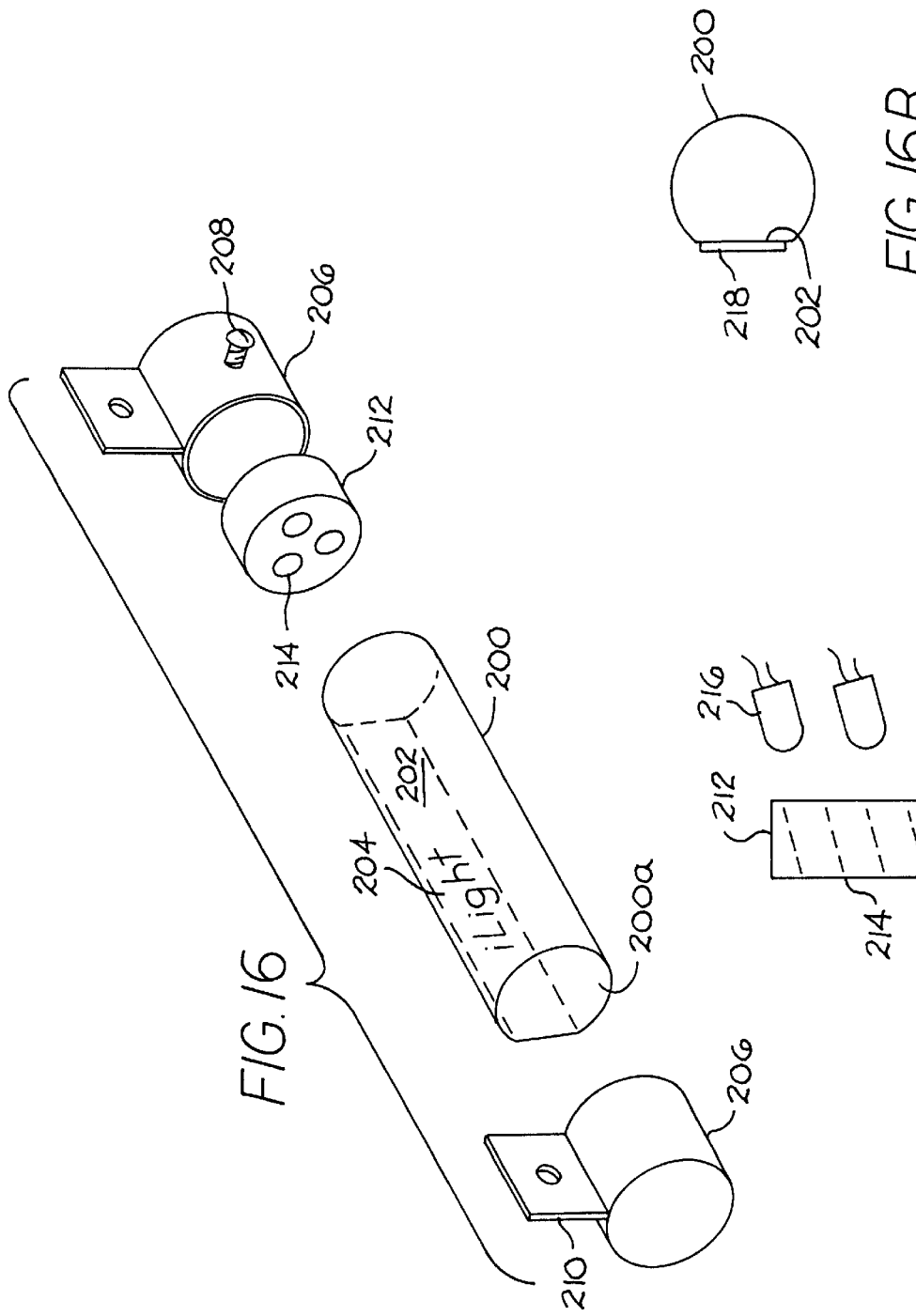

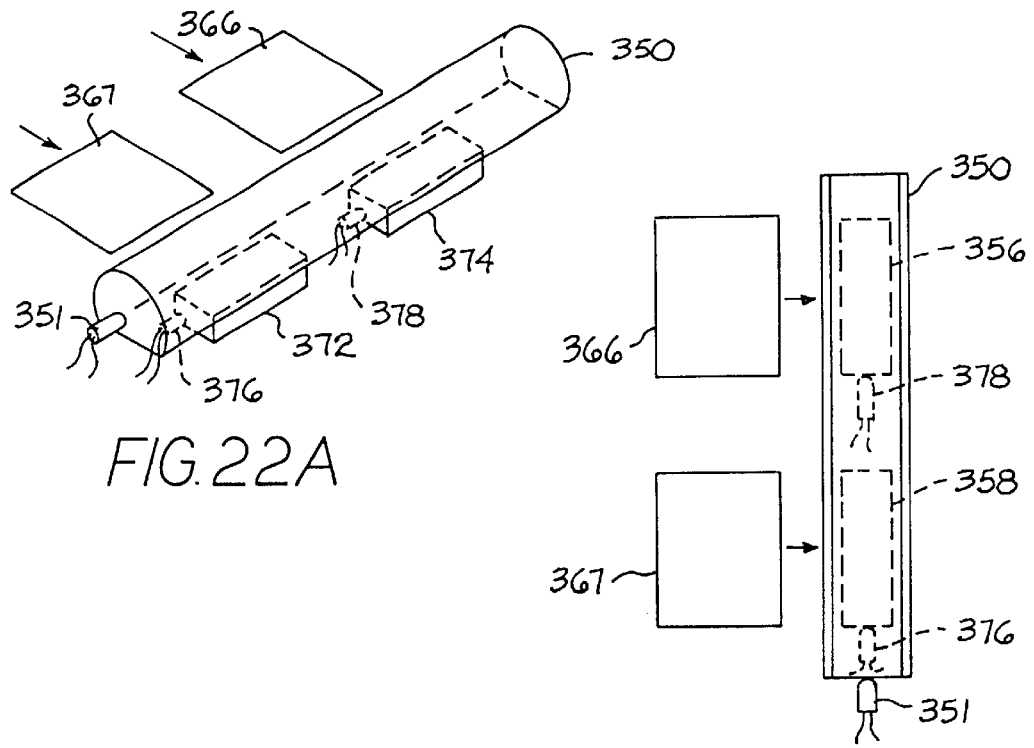
FIG. 22A
FIG. 22B
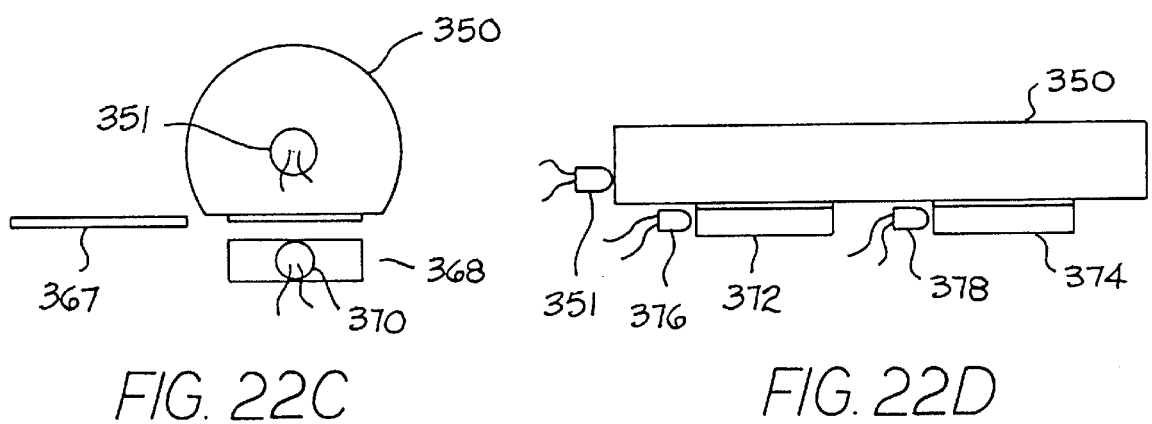
FIG. 22C
FIG. 22D

OPTICAL WAVEGUIDE ILLUMINATION AND SIGNAGE DEVICE AND METHOD FOR MAKING SAME

BACKGROUND OF THE INVENTION

This application for patent claims priority from Provisional Patent Application Serial No. 60/200,411 filed Apr. 28, 2000, Provisional Patent Application Serial No. 60/229,018 filed Aug. 30, 2000, and Provisional Patent Application Serial No. 60/250,722 filed Dec. 1, 2000.

The present invention relates to a lighting device or apparatus and, more particularly, to a lighting device using an optical waveguide emitting light laterally and adapted for multipurpose uses such as the illumination of signs and luminescing alphanumeric representations.

In general, a large segment of artificial lighting is done with neon lighting, particularly in those applications for lighting such as signs and luminescing writing. Despite its popularity for such applications, however, neon tubing is not a friendly material because it requires the use of transformers, is not readily transportable as the tubing readily breaks, and becomes significantly hot during use. The operating temperature of the tubing further limits its application to those environments permitting heat development. Moreover, the entire assembly of transformer, tubing, housing, and related accessories is heavy, further limiting the applications of the tubing to those instances permitting sufficiently strong, underlying structure to support the assembly. Additionally, the cost of tailoring a glass tube capable of being used in neon lighting is high, particularly in those applications where the tubing takes the shape of alpha/numeric or pictorial representations, and thus out of the economic reach of many potential customers and users who desire to have neon lighting in such shapes. The complexity and fragility of neon lighting systems, i.e., transformers and gas enclosing glass tubing, tend to exacerbate breakdowns of the systems, particularly in those more hostile environments.

There have been numerous attempts to develop lighting devices the emulated neon tubing over the years. The patent literature has several examples of these attempts. U.S. Pat. No. 4,891, 896 describes a simulated neon sign using raised translucent indicia stamped into an otherwise opaque plastic panel which is back lit by non-neon lighting. There is a further description of how the halo effect of neon lighting is simulated. U.S. Pat. No. 4,976,057 pertains to a simulated neon sign in which hollow tubes are made into the shape of letters and secured to a plastic panel. The panels are transparent in the area of the tubes and opaque in the other areas. Colored strips of translucent material may also be behind the tubes. A light source such as florescent tubing provides the light which is diffused into the tube to cause it to glow thereby simulating neon tubing. An alternate embodiment uses an array of light emitting diodes (LEDs) oriented in the shape of the tubes and positioned immediately behind the tubing to cause the tubing to glow. Still another more recent innovation to simulate neon tubing is found in U.S. Pat. No. 6,205,691 describing a lighting device comprising a transparent substrate that has grooves forming words or designs. The rearward facing side of the substrate is provided with a light blocking layer through which the grooves extend and a transparent layer over the light blocking layer and grooves. The grooves are roughened to provide a neon-like glow when the substrate is back lighted by any light source.

U.S. Pat. No. 5,537,297 describes a neon light substitute device comprising a curved transparent tube where both ends are enclosed in a housing. A light source is positioned adjacent the end and an opaque strip is placed along the length of the exposed portion of the transparent tube covering a minor portion of the circumference of the tube. According to the patent, light shining into the tube is partially reflected out of the side wall of the tube, thus emulating neon lighting. A later issued patent U.S. Pat. No. 6,123,442, describes the use of an optical waveguide or large diameter light fibers using a diffuse light reflecting material around a portion of the light fiber to cause light to exit in a desired direction transverse to the axis of the fiber. The patent also discusses the use of the light fibers in the form of alphanumeric symbols illuminated by the diffuse light and illustrates this in FIGS. 6, 7, and 8.

Despite the attempts of simulating neon lighting by those in the prior art, the efforts have fallen short of solving the triple, dilemmas of complexity, size, and environmental adaptability. There still remains a severe need for technology that will provide economic and friendly lighting devices and are ready substitutes for neon lighting. It is therefore a paramount object of the present invention to provide a superior alternative to present neon and neon-like lighting devices, both in cost and application, through the use of high intensity light sources such as high intensity LEDs coupled with optical wave guides for various signage and display applications. It is still another significant object of the present invention to provide for a lighting device that is easily adapted for use with signage and other alphanumeric/ pictorial representations for various decorative, consumer, commercial, architectural, and other uses. Still another important object of the present invention is to provide a lighting device that avoids complexities such as the use of transformers, glass tubing, and heavy support structures necessary for neon lighting devices. Yet another object of the present invention is to provide for a lighting device that is easily fabricated, uses light weight materials largely break proof, and flexible in manufacturing to be formed into various desired shapes at economical costs. Yet another important object of the present invention is to provide for a lighting device that can be readily fabricated for customer specific purposes while maintaining optimal performance and economics of manufacture. These and other important objects of the present invention are addressed by the ensuing detailed description and appended drawings.

SUMMARY OF THE PRESENT INVENTION

In accordance with one embodiment of the present invention, an illumination device comprises at least one housing, at least one high intensity light emitting diode (LED) positioned within the housing, an optical waveguide of predetermined length having one end secured to said housing with an end surface adjacent to said LED so that light emitted from the LED enters into the waveguide through the end surface, and having a surface area of the waveguide intermediate the end surfaces thereof optically treated so as cause a portion of the light incident upon the surface area to be reflected out of the waveguide through a second surface area located intermediate the end surface thereof. The waveguide may also be rotatable relative to the housing so as to change the direction of the light through the second surface area. Additionally, in accordance with a further preferred embodiment of the present invention, indicia may be placed within or near the first surface area and illuminated so as to be reflected out or at least visible through the second surface area.

BRIEF DESCRIPTION OF THE DRAWINGS

FIG. 16 is an exploded perspective of the application of the present invention to signage;

FIG. 16A is a side view of the LED holder that may be used in the signage device of FIG. 16.

FIG. 16B is an end view of the light pipe shown in FIG. 16;

FIGS. 22A, 22B, 22C, and 22D are, respectively, a perspective, top view, front view, and side view of a signage showing the same features as FIGS. 21A-D except the structure of the waveguide providing the back lighting structure is different.

DETAILED DESCRIPTION OF THE PREFERRED EMBODIMENTS

From time to time during this description, use will be made of the term "light pipe" which are optical waveguides or optical fibers typically formed by injection molding from acrylic or polycarbonate materials. The light pipes are efficient light waveguides having essentially total internal reflection with little absorption of the light and no need for any optical coatings. Light pipes are readily available products and can be purchased, for example, from the; Bridgestone Corporation. While a preferred shape of the light pipe is cylindrical, other and different shapes may be used for various applications. As will be readily apparent for the signage applications discussed in detail below, a cylindrical shape does provide certain magnifying properties that are extremely advantageous when viewing illuminated indicia.

Figure 1:
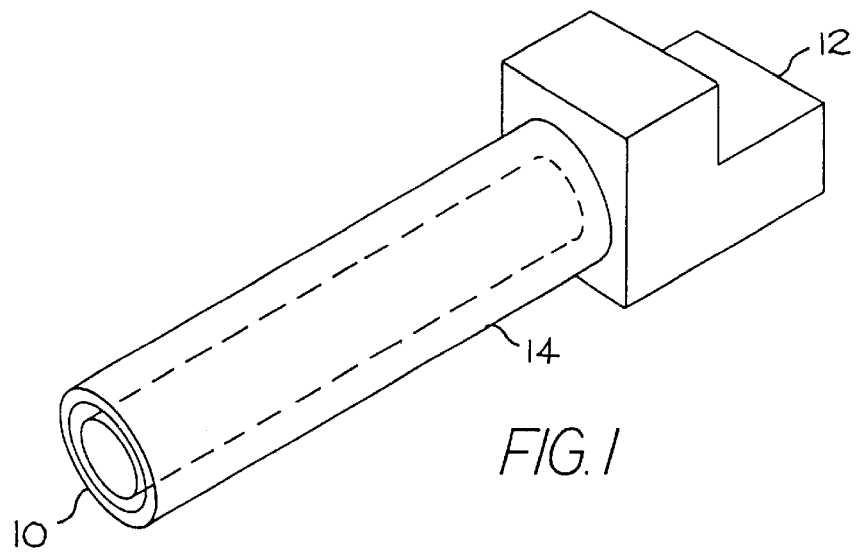
FIG. 1 is a perspective view of light illumination device with a light pipe for emitting light laterally out of the light pipe.
Figure 2:
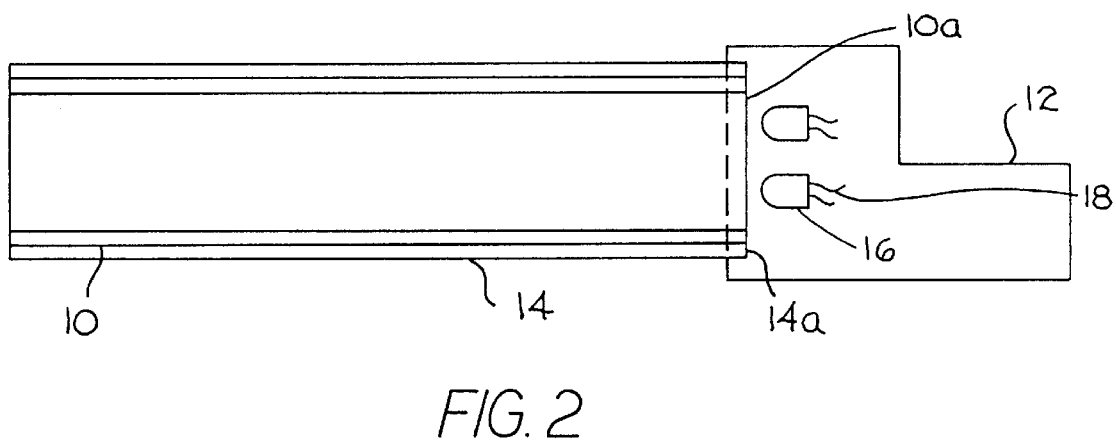
FIG. 2 is a side view of the device of FIG. 1.
Figure 2A:
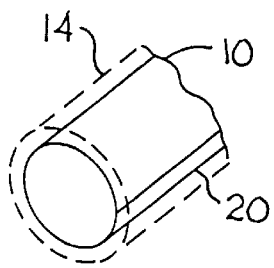
FIG. 2A is a perspective view of one end of the device of FIG. 1 with the outer tube shown in dashed lines.

Reference is first made to FIGS. 1, 2, and 2A that illustrate a first embodiment of the invention. A light pipe 10 has one end 10a enclosed by support housing 12 and extends a predetermined distance from the housing 12. A tube 14 of a larger internal diameter completely circumscribes pipe 10 essentially spaced at all points equidistant from pipe 10 and similarly has one end secured within the housing 12. Light pipe 10 and tube 14 may be mounted for rotational movement with respect to housing 12 so that they can be rotated relative to one another. Tube 14, among various purposes, can serve as a protective shield as a substitute for cladding materials typically used in the prior art. Among many uses, tube 14 serves as a shield against the undesired degradation that may occurs to the light pipe 10 due to ultraviolet light In some instances, tube 14 may be completely transparent to visible light (essentially 4000 to 7000 Angstroms). For other applications, however, it may be desirable to use tube 14 as a filter for certain wavelengths for specific color enhancements or to reduce glare. That is, with respect to the former application, the tube 14 can be supplied with a pigment that filters out light of undesirable wavelengths. Similarly, the undesired effect of ambient light may be significantly reduced which otherwise may deleteriously effect the efficiencies of lighting, particularly in outdoor environments or areas where other high intensity lighting is positioned in adjacent regions.

Housing 12 further encloses a light source, preferably one or more high intensity light emitting diodes ("LEDs") 16, positioned adjacent the surface of pipe end 10a. The energy source to which the leads 18 of LEDs 16 are connected is not shown; however, it should be understood that this could be any source amenable to the powering of LEDs 16 including batteries.

Various techniques may be employed to cause a substantial amount of the light to be transmitted out of the side walls of the light pipe 10. One preferred technique is to use a light reflecting stripe or tape adhered to the circumference of the pipe 10 that interferes with the normal internal reflection normally associated with optical waveguides. As seen in FIG. 2A, a reflecting stripe 20 is positioned on or secured to the outer surface of pipe 10 and extends its longitudinal length. Preferably, the stripe extends ⅓ to ½ about the circumference of the pipe 10. Stripes may be painted directly on the pipe 12 using an epoxy or paint, of various pigments and colors. In other applications, it may be desirable to use an aluminized stripe. To enhance certain color effects, however, the stripe may employ a selected pigment. Some of the light entering the pipe 10 is directed toward the stripe 20 and is reflected toward the opposite side of the pipe 10 where the material of pipe 10 itself acting as a lens, collimating the light as it laterally exits the waveguide.

Figure 3:
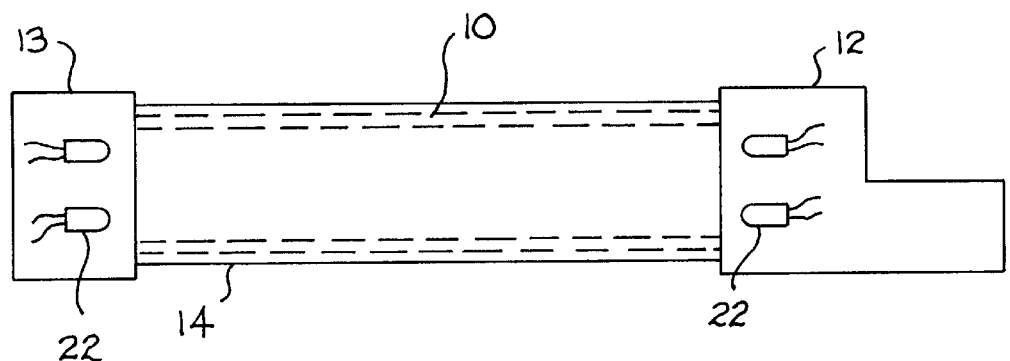
FIG. 3 is a side view of the device shown in FIG. 1 with the addition of a second end cap or housing.

In some instances, it may be desirable to enclose both ends of the light pipe 10 and tube 14 as shown by end cap 13 in FIG. 3. For longer light pipe applications, it may be desirable to have both ends supported. The end cap 13 may also include a second set of LEDs 22 that direct light into the other end of pipe 10 to further increase the intensity of the light reflected laterally.

Figure 4:
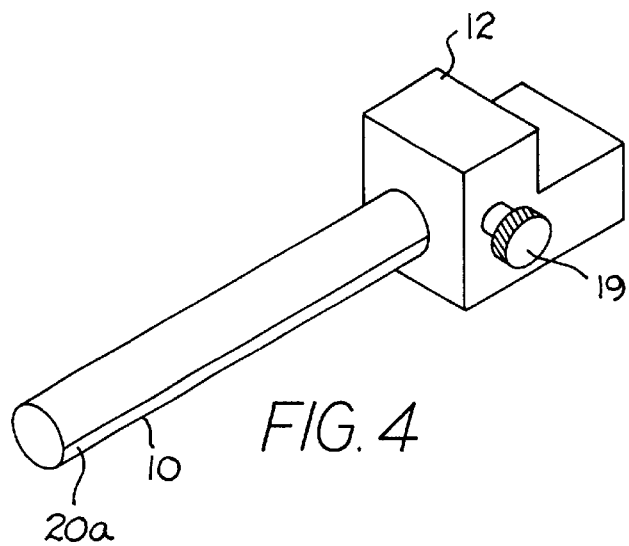
FIG. 4 is a perspective view of an alternate embodiment similar to that illustrated by FIG. 1 except no outer tube is present.
Figure 5A:
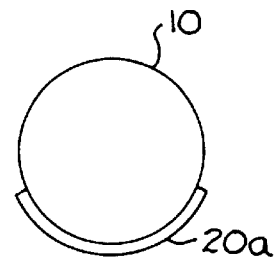
FIG. 5A is an end view of FIG. 5.
Figure 5:
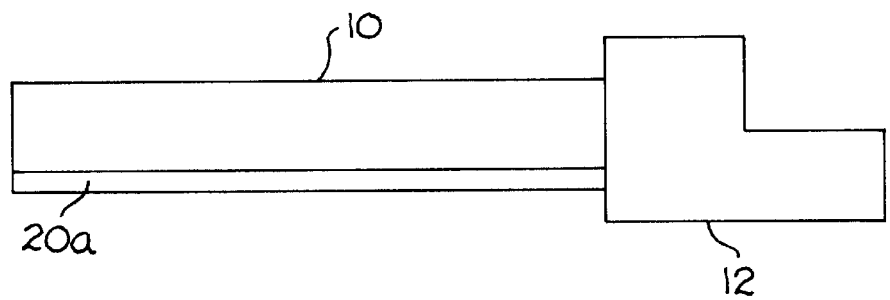
FIG. 5 is a side view of the device of Figure of FIG. 4.

As mentioned briefly above, light pipe 10 may be rotated with respect to housing 12 and tube 14 enabling the laterally transmitted light to be directed as desired. For example, in many applications, it may be desirable to have housing 12 fixed adjacent a specific area to be illuminated. This can be accomplished by rotating the light pipe so the side opposite the reflecting stripe is facing the area to be illuminated. For some applications, it may be desirable to eliminate the outer tube 14 using the light pipe 10 alone as shown in FIGS. 4, 5, and 5A. As before the light pipe 10 may be rotated with respect to the housing 12 and then fixed into place through the tightening of a set screw 19. Reflecting tape 20a ensures reflection of light out of the side surfaces of the light pipe 10.

Figure 6:
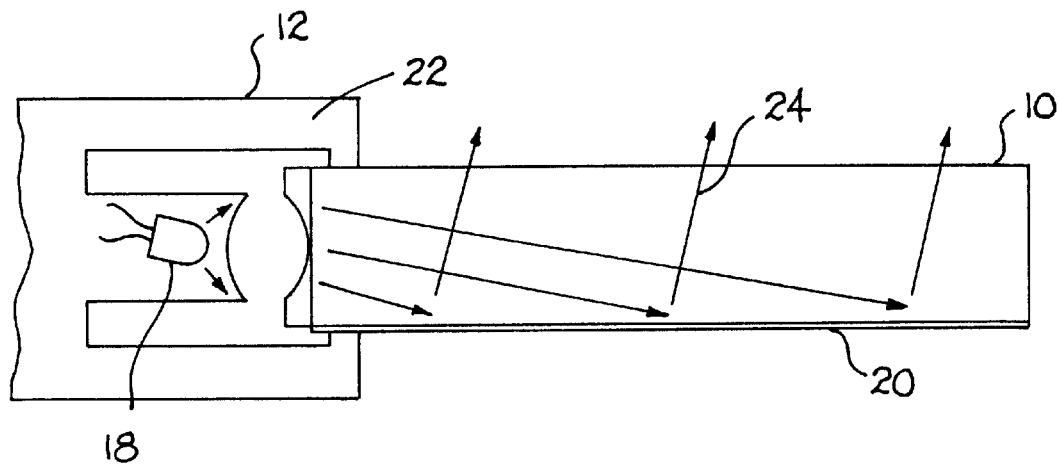
FIG. 6 is a side view of the device of FIG. 4 with a portion of the outer wall of the housing eliminated to show the presence of a lens for directing the LED light onto the reflecting stripe.
Figure 7:
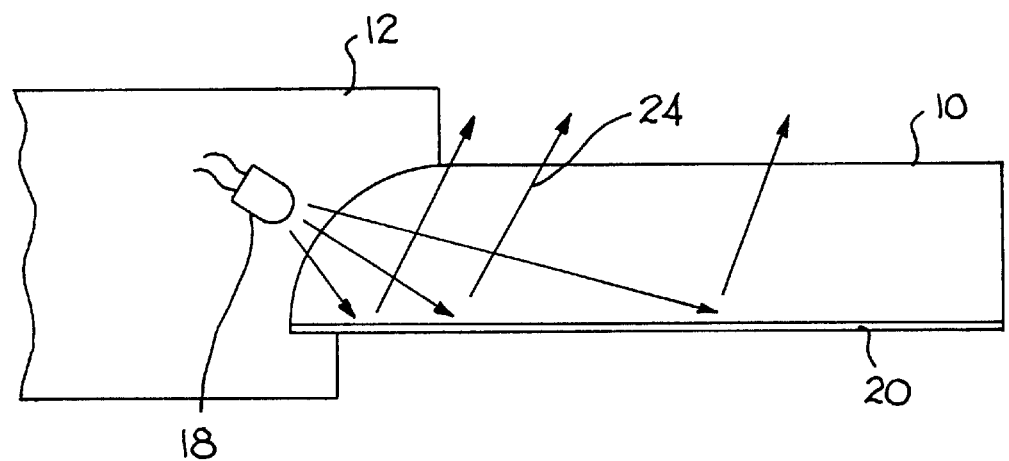
FIG. 7 is a side view in which the end of the light pipe is formed into a shape having lens properties so as to direct the LED light onto the reflecting stripe.

As best seen in FIGS. 6, a lens 22 may be used to assist in directing the light emitted by the LEDs 18 toward the reflecting stripe 20 to facilitate lateral transmission of the light as depicted by arrows 24. An alternative structure shown in FIG. 7 uses the lens properties formed in the enclosed end of the light pipe 10 itself to assist in the lateral transmission of the light. In this particular structure the light pipe 10 is provided with convex shaped end 10b. However, it is clear that both the end of the light pipe could be provided with various lens acting shapes and the cross-section of the light pipe while preferably circular could be any shape that guides and allows light transmission.

Figure 2B:
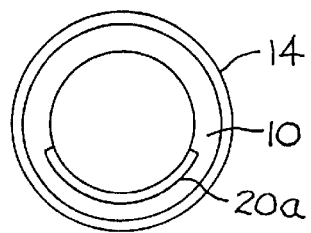
FIG. 2B is an end view of the light pipe of FIG. 2 using a reflecting tape adhered to the waveguide.
Figure 2C:
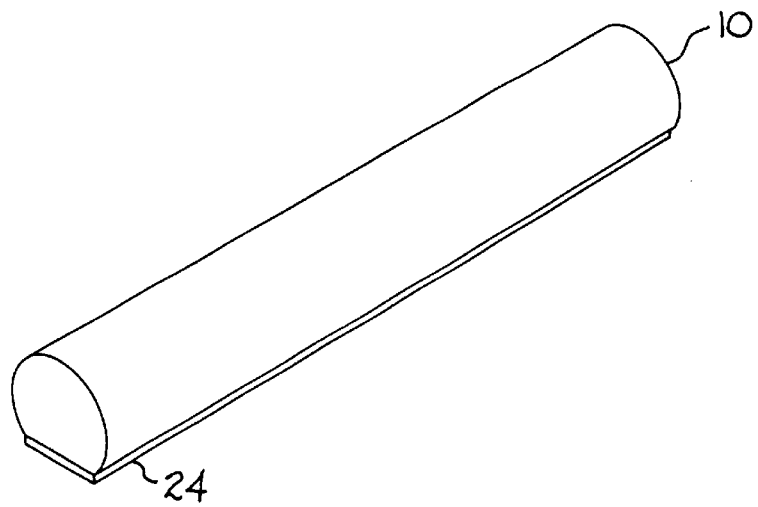
FIG. 2C is a perspective view of a light pipe having a flattened surface area to which a strip of holographic material is adhered for reflecting light laterally out of the side surfaces of the light pipe.
Figure 2D:
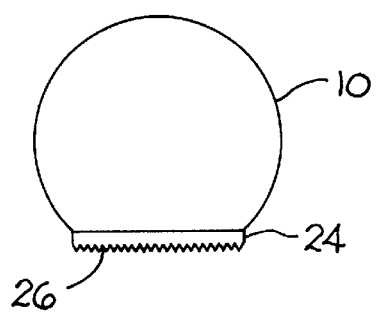
FIG. 2D is an end view of the device shown in FIG. 2C.
Figure 2E:
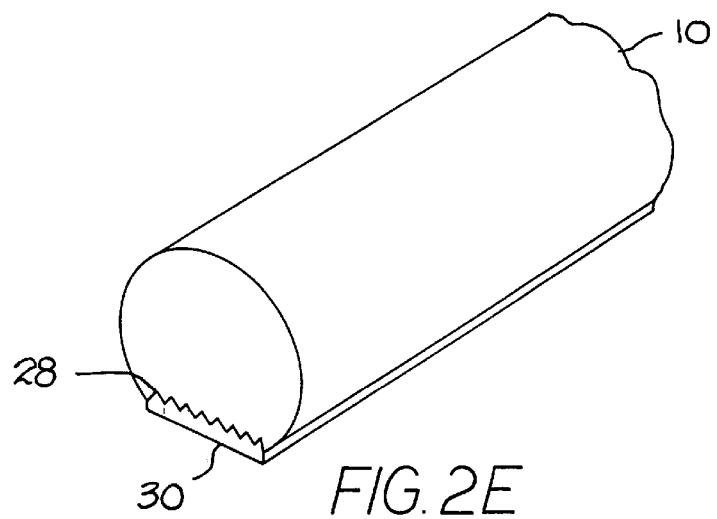
FIG. 2E is perspective view of one end of a device similar to that in FIG. 2C with grooves cut directly into the light pipe itself.

There are other techniques that may be employed to cause light to be reflected laterally out of a light pipe in a desired direction. Other examples of alternative techniques are shown in FIGS. 2C–2E. As shown in FIG. 2C (without the circumscribing tube 14), the light pipe 10 is flattened on one side to facilitate attachment of a sheet of "holographic" material 24 glued or epoxied to the flattened side. The sheet 24 is comprised of a multiplicity of very fine or microscopic grooves 26 that tend to direct light incident thereon out of the light pipe 10 on the side opposite the sheet 24. The grooves 26 can best be seen in FIG. 2D although they are exaggerated in size and certainly not to scale. Moreover the direction of the grooves can be varied as desired including being oriented transversely to the longitudinal axis of the light pipe 10. Still another technique is to cut grooves 28 directly in to the tube 14 itself as shown in FIG. 2E over which, if desired, a light reflecting coating 30 may be applied. The term "optically altering characteristics" or "optically altering state" as used in this application defines any color or intensity provided to light that is reflected out of the light pipe through a surface portion intermediate the end surfaces of the light pipe. Thus, any surface having optically altering characteristics or having an optically altering state shall include any surface that is painted, covered with a material, or physically changed in such a manner that a portion of the light traveling the length of the light pipe is caused to be reflected laterally out of the waveguide, i.e., out of a surface area intermediate the ends of the light pipe, and is inclusive of any paint, covering or surface treatment which selectively filters certain wavelengths of reflected light. If desired, the material comprising the light pipe 10 may be tinted to selectively filter certain wavelengths of light.

Figure 8:
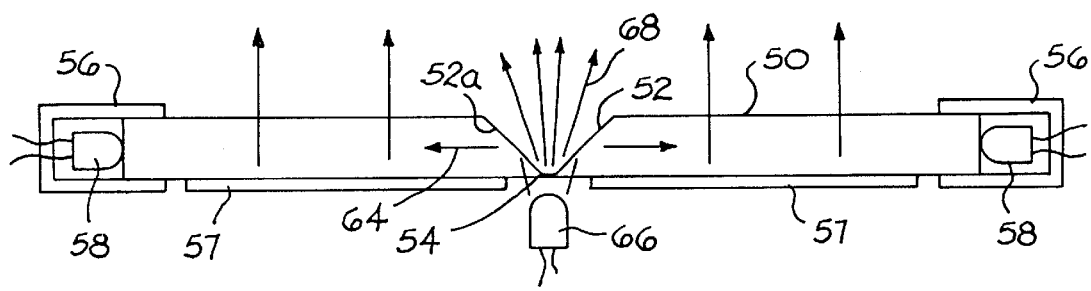
FIG. 8 is a side view of an embodiment in which a first structure is provided to minimize light attenuation over long lengths of light pipes.

Because of the light weight and flexible type of materials that used in the fabrication of the light devices of the present invention, devices can be constructed to virtually any length. The housings and end caps can be provided with fastening devices that allow the devices to be secured in any position desired. The number of LEDs required, of course, depends upon the application and, to some extent, the length of the light pipe used. Generally, the longer the light pipe, the more LEDs that will be required. One problem that occurs as light pipes become extended is the noticeable attenuation of the desired laterally transmitted light from the central regions of such light pipes. FIG. 8 represents one example of a construction to alleviate attenuation. In this example, a long length of light pipe 50 is notched along the center forming a V shaped open region defined by inclined walls 52 with a flattened wall 54 at the bottom thereof. The pipe 50 is preferably provided with a reflecting stripe 57. Each end of the light pipe 50 is secured within a housing 58 that encloses one or more LEDs 58. As before the light pipe 50 may rotatably mounted within the housings 56 so as to permit the direction of the laterally transmitted light indicated by the arrows 62 to be adjusted. The internal surfaces 52a of walls 52 may be treated to be reflect light transmitted by the pipe 50 as depicted by arrows 64. To hide or disguise the region formed by walls 52 and otherwise significantly eliminate dark spots along the length of the light pipe illumination device in FIG. 8, a LED 66 may be placed adjacent the flattened wall 54 that permits additional transmission of light through the walls as shown by arrows 68.

Figure 9:
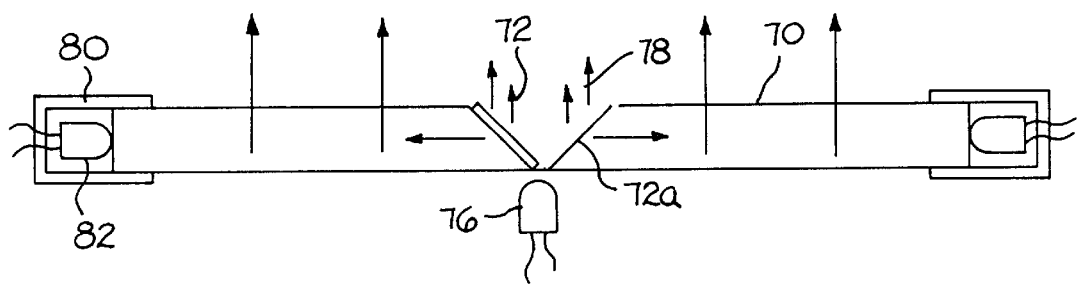
FIG. 9 is side view of still another embodiment in which a second structure is provided to minimize light attenuation over long lengths of light pipes.

A similar structure is shown in FIG. 9 depicting an elongated light pipe 70 with a V-shaped region defined by inclined walls 72. As before, the ends of the pipe 70 are fired by LEDs 82 housed within housings 80. The internal surfaces 72 of walls 72 are treated to permit some of the light from LED 76 to pass directly through the walls 72 to accomplish the same desired result as discussed above for hiding the region and substantially eliminating dark spots.

Figure 10:
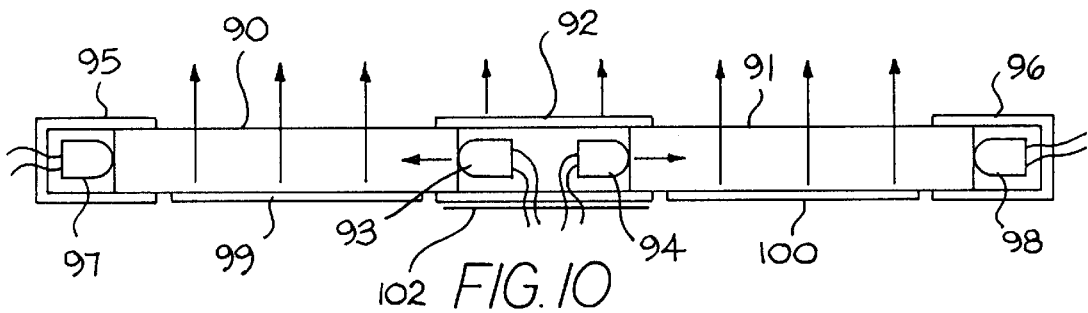
FIGS. 10, 11, and 12 are side views of various alternative structures to join lengths of light pipe and minimize light attenuation at the joining member or joint.
Figure 11:
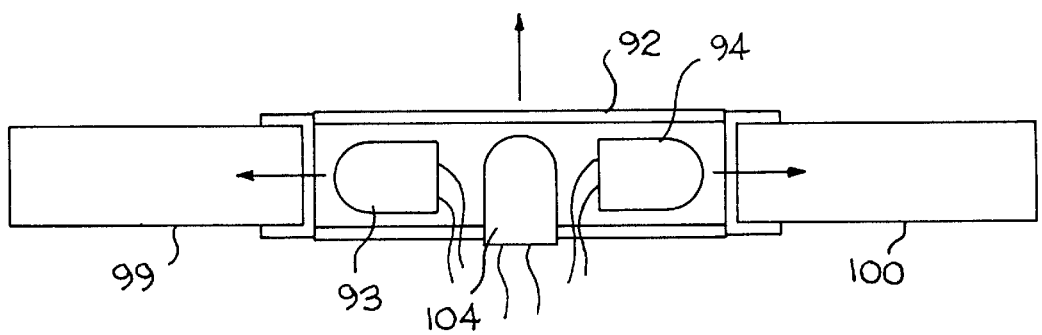
Figure 12:
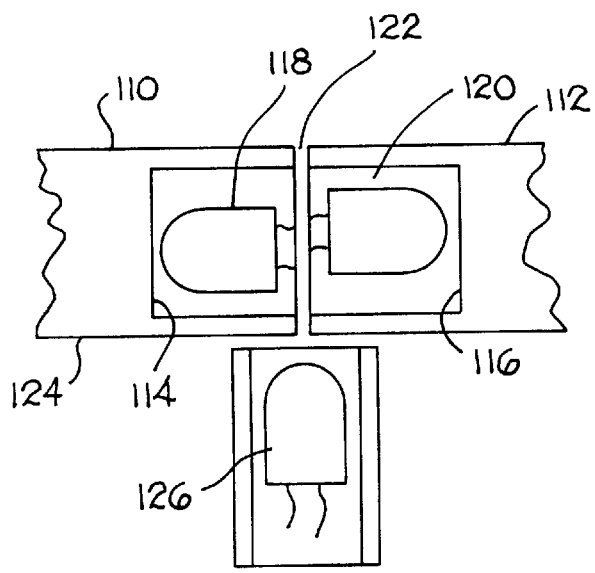

FIGS. 10, 11, and 12 represent various alternative structures that may be employed when long runs of light pipes are needed. In the structure shown in FIG. 10, a pair of light pipes 90, 91 are connected to a common housing 92 that encloses first and second LEDs 93, 94 to respectively fire the ends of the associated pipes. Each of the other ends of the pipes 90 and 91 are respectively housed within housings 95, 96 and fired by respective LEDs 97, 98. A reflective stripe 99, 100 is positioned along the length of each light pipe 90, 91. To promote uniformity of light transmitted laterally along the length of the illumination of the device of FIG. 10, the walls of the common housing 92 may be treated to allow light to be transmitted directly from the LEDs 93, 94 in a direction commensurate with the lateral transmission of light from pipes 90, 91. The bottom of common housing 92 may be covered with a reflecting stripe 102 similar to that used for the light pipes. The structure set forth in FIG. 11 is very similar to that of FIG. 10 (with the end housings not being shown) but includes a third LED 104.

In the further alternative structure illustrated in FIG. 12, the joint between lengths of light pipes may built directly into the light pipes. To accomplish this, the ends of two light pipes 110 and 112 are provided with bores 114, 116 into which respective LEDs 1118, 120 are positioned. The housings at the other ends of the light pipes are not shown in this view. The ends may be epoxied or otherwise secured together defining a joint 122. To further mask the joint 122 between the two light pipes, a reflecting stripe 124 otherwise extending the combined length of the light pipes 110 and 112 may be eliminated in the area of the joint 118. A third LED 126 may be housed to fire light into this joint region to substantially reduce light attenuation in this region.

Figure 13:
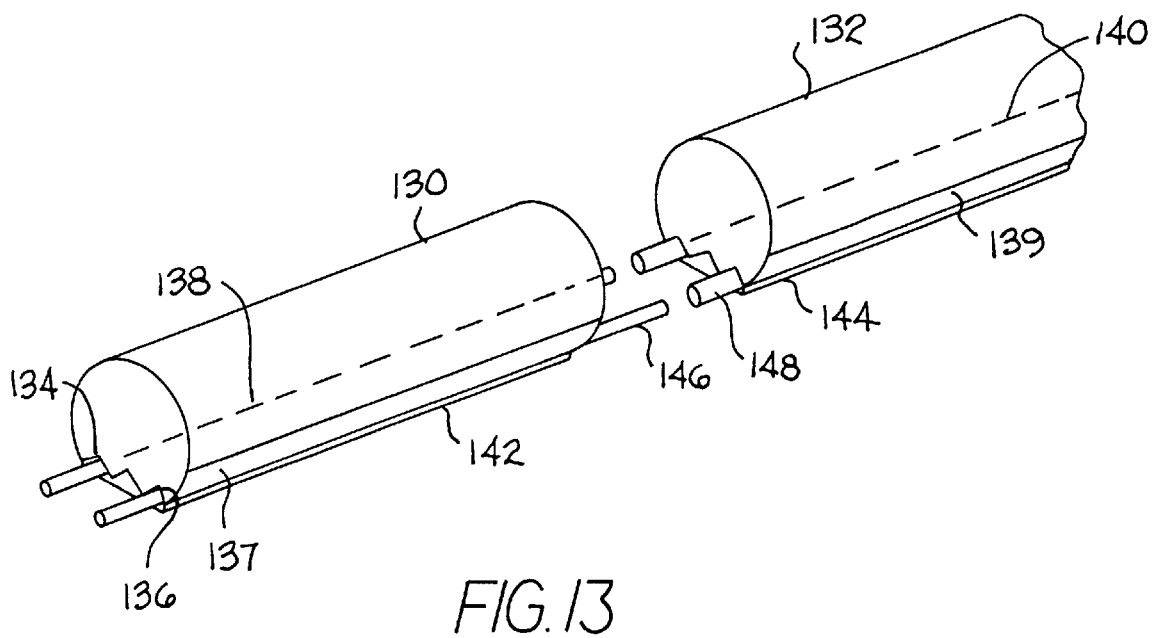
FIG. 13 is perspective showing a technique of placing joined ends of light pipes in electrical connection.

FIG. 13 illustrates a structure showing a convenient way of establishing electrical communication between two light pipes joined together in the manner shown in FIG. 12. In this arrangement, the two light pipes 130 and 132 have flat regions in which a plurality of FIG. 2B is a perspective view of one end of the device of FIG. 1 with the outer tube shown in dashed lines; longitudinally extending grooves 134, 136 are formed. Reflecting material or stripes are preferably adhered or painted over the grooves as shown by stripes 137, 139. The grooves 134 and 136 are dimensioned sufficiently large to accept electrical leads 138 and 140. Protective strips 142, 144 strip may be placed over the leads to secure the leads to the light pipes 130 and 132. As can be seen the leads 138 extending from the right end of light pipe 130 have male ends 146 compatible with the female ends 148 of light pipe 132. In this manner multiple lengths of light pipe may be constructed with the various LEDs of each placed into electrical communication.

Figure 14:
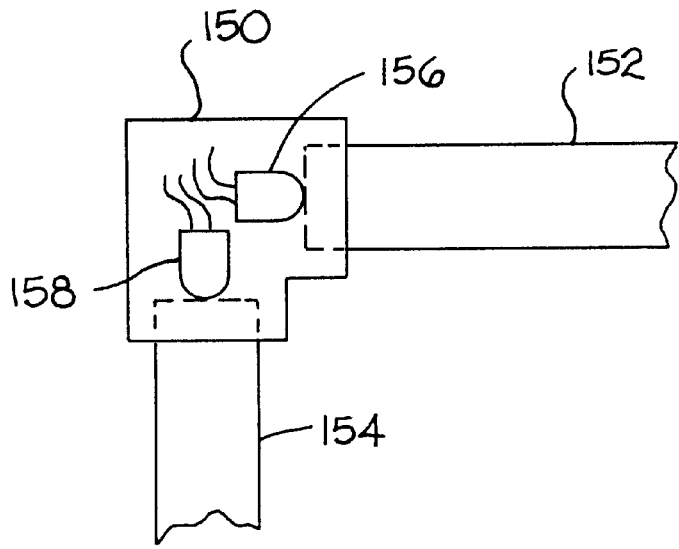
FIGS. 14 and 15 show side views of a structure and variation thereof to connect light pipes in arrangements other than linear.
Figure 15:
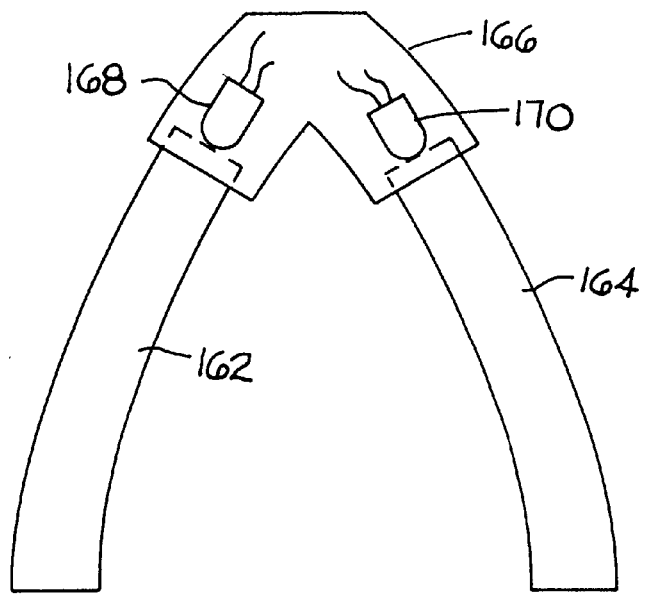

FIGS. 14 and 15 represent examples of connections that permit arranging light pipes into configurations other than end to end linear arrangements. FIG. 14 depicts housing structures that connect adjacent light pipes into a right angle configurations. Each housing 150 accepts two ends of light pipes 152 and 154 with the axes arranged transversely. LEDs 156 and 158 secured within housing 150 are respectively oriented to fire into the associated end of the adjacent light pipe. The variation of FIG. 15 shows obliquely oriented and/or curved light pipes 162 and 164 joined by a common housing 166 and fired by respective LEDs 168 and 170.

The present invention is particularly adaptable to use as signage in hostile environments due to light weight, low heat output and energy consumption, and being virtually unbreakable. The light weight allows the device to be placed in any locations such as a desk, counter or shelf. The low heat output permits it to be used in environments unattainable by neon lighting such as in freezers and refrigerators. Reference is now made to the exploded perspective of FIG. 16, and FIGS. 16A, 16B that depict an embodiment of the present invention illustrative of a signage application. Light pipe 200 cylindrical in section has a flatten surface portion 202 for bearing the "indicia" noted by character numeral 204 and here shown as the arbitrary word "Light". "Indicia" as used in this application shall mean either alphanumeric representations or designs or both. Moreover, the indicia can be printed on reflective tape or painted directly on the surface of the light pipe or either on the flat rear portion or curved front portion as perhaps best seen in FIG. 17C.

Figure 16C:
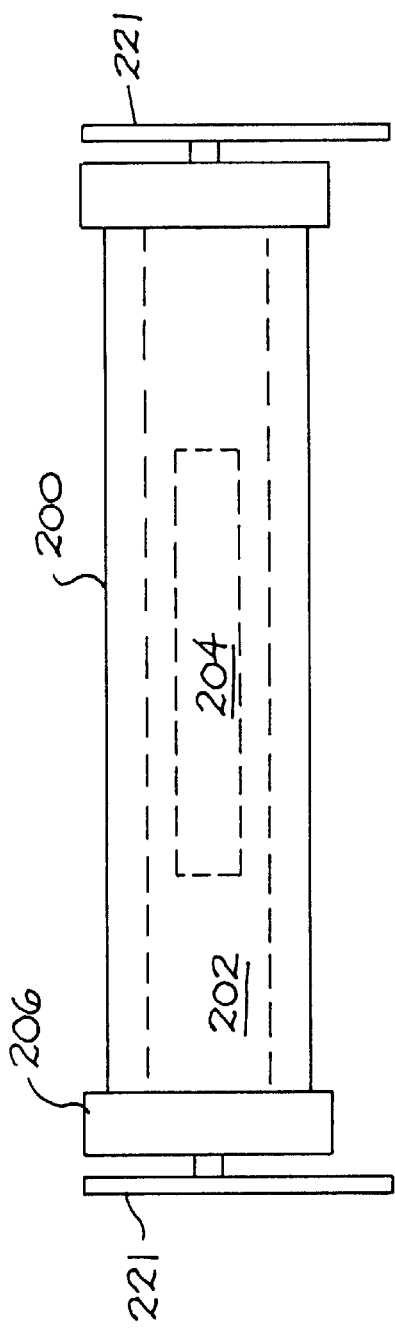
FIG. 16C is a side view of an alternate support structure for the signage illustrated in FIG. 16.
Figure 16D:
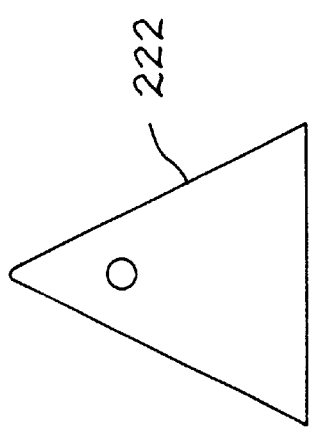
FIG. 16D is an end view of the structure in FIG. 16C

The ends of light pipe 200 may be rotatably mounted within a pair of end cap housings 206. The left end cap housing 206 is depicted with a set screw 208 allowing the pipe 200 to be rotated and then fixed relative to the end cap housings 206 so as to permit the flat surface bearing the indicia 204 to be positioned for the most appropriate viewing. Each end cap housing 206 has a flange 210 that can be fixed to a surface through the use of fasteners. It is understood that there are a multitude of securing devices that would permit the device of the present invention to be fastened to various support structures. Moreover, the device of the present invention could be provided with its own pedestal or seating structure 222 (as best seen in FIGS. 16C and 16D) for placing it on horizontal surfaces if desired allowing light pipe 200 to be rotated to an appropriate viewing position as desired. It is not intended that the fastening structure as shown to be limited as to placement of the device of the present invention.

The LEDs used to fire the light pipe 200 may be placed into a cylindrically shaped holders 212 that can be oriented as desired within one or both of the end cap housings 206. As best seen in FIG. 16A, holder 212 is provided with a plurality of bores 214 adapted to receive LEDs 216. The bores 214 are angled within holders 212 to facilitate the directing of light onto the indicia 204. The end surface 200$a$ can be optically clear for light from the LEDs, mirrored to reflect light back along the length of the light pipe, or in some instances, roughened to provide scattering of light so as to make more uniform the light incident upon the flat portion 202. The end view afforded by FIG. 16B shows a strip of material 218 adhered to the flat portion 202 of the pipe 200. This material may be light reflecting or light absorbing tape with the indicia printed thereon. Alternatively, the indicia may be placed directly on the surface of the light pipe and a light reflecting or absorbing stripe painted over the indicia.

Figure 17B:
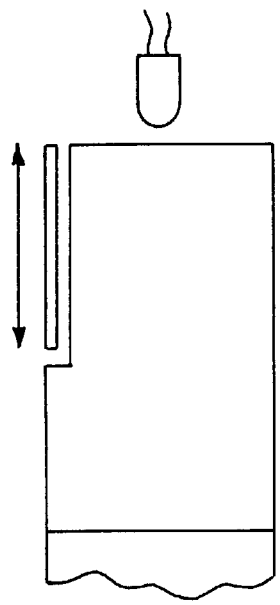
FIG. 17B is a side view of a tandem waveguide device similar to that in FIG. 17A showing the removability of a member bearing indicia.
Figure 17:
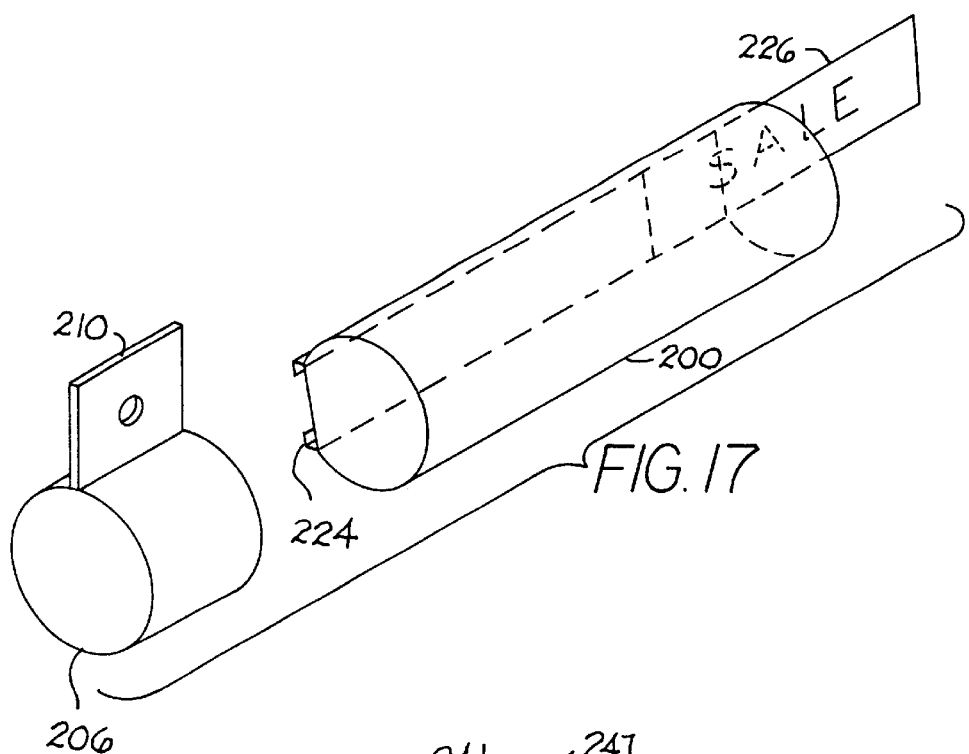
FIG. 17 is a perspective view of still another embodiment of the present invention showing signage where the indicia can be manually changed.
Figure 17A:
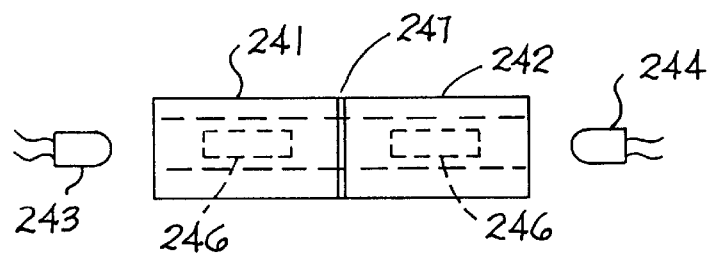
FIG. 17A is a side view of a signage device in accordance with the present invention in which two waveguides with indicia are mounted in tandem.

It may be desirable to have an optical device in accordance with the present invention where the indicia can be easily and manually changeable when desired. The embodiment of FIG. 17 depicts a light pipe 200 with a channel member 224 secured to the back side allowing a strip 226 of material bearing indicia to be removably positioned therein in registry with the flat portion 202. In this manner should a sale person have need of changing the price of the article being advertised, it can be done expeditiously. By incorporating a pair or more aligned light pipes (as described above) with the indicia, great flexibility can be provided to the signage applications of the present invention. As illustrated in FIG. 17A, a tandem of light pipes 241, 242 are positioned end to end. Each light pipe is fired by an associated LED 243, 244. The abutting ends of each light pipe 241, and 242 are mirrored (shown as character numeral 247) so as to reflect light incident thereupon back along the respective light pipes. Each of the light pipes may be provided in any manner described above with separate messages along the flattened surface portions thereof in the form of indicia 245, 246. For visual impact, one set of the LEDs could intermittently blink on and off, fade in and out, or provide different colors to the separate indicia to emphasize a word, phrase, or design. Additionally, as depicted in FIG. 17B, one of the messages could be placed on a member 249 that could be removably placed into a recessed region 251 within the material of the light pipe itself.

Figure 17C:
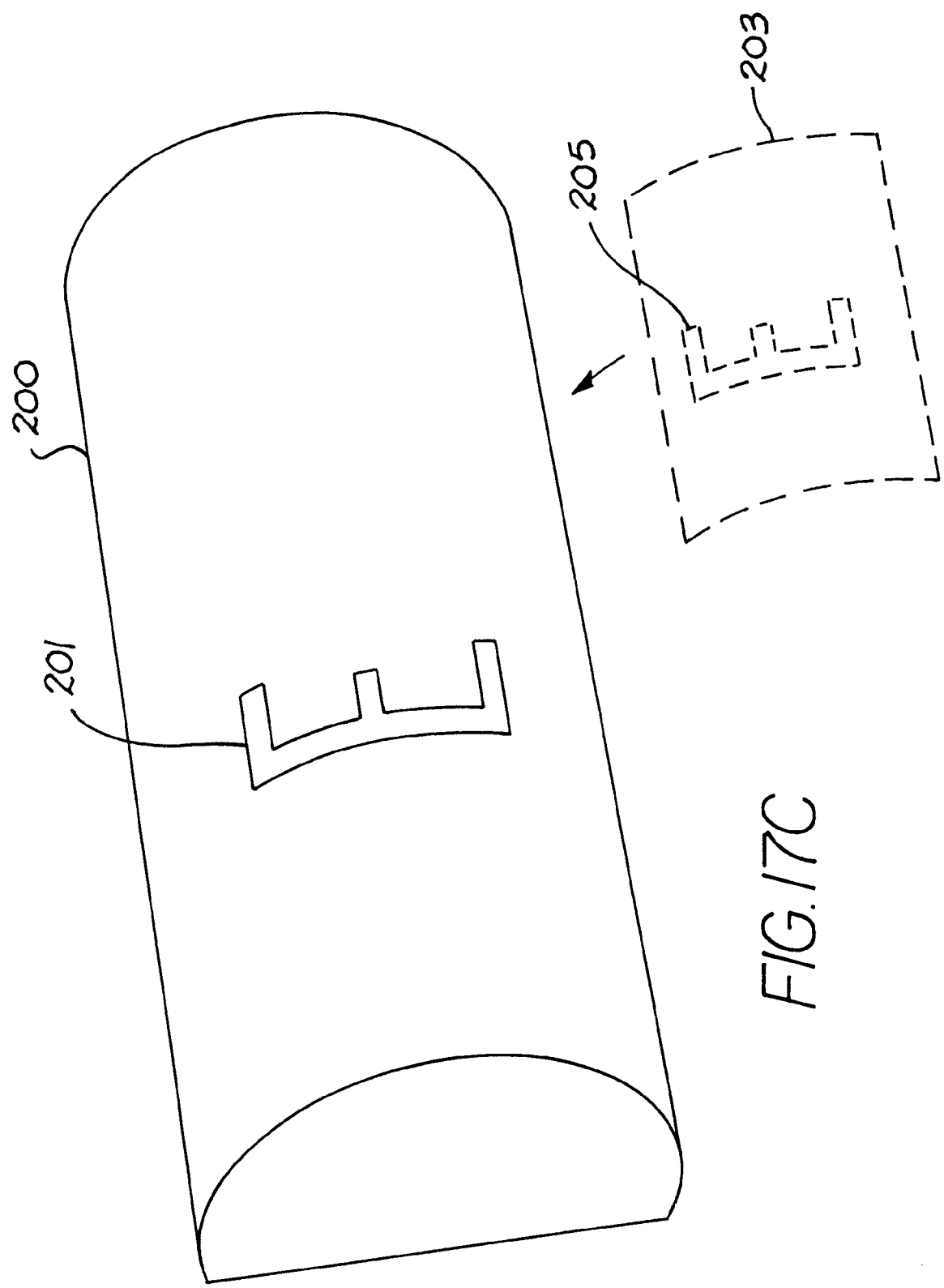
FIG. 17C is a perspective of still another embodiment of the present invention with the indicia mounted on the curved front surface of the waveguide

It should be understood that while it is preferred to have a flattened surface portion which accepts the indicia whether in the form of paint, tape, or on a separate abutting member, the indicia could be painted or other wise placed on the front surface of the light pipe. This is shown best by FIG. 17C showing the front surface with a letter E painted thereon noted by character number 201 or, as shown in dashed lines, printed as "E" denoted by character numeral 205 on a transparency 203 adapted to be adhered to the front surface.

Figure 18:
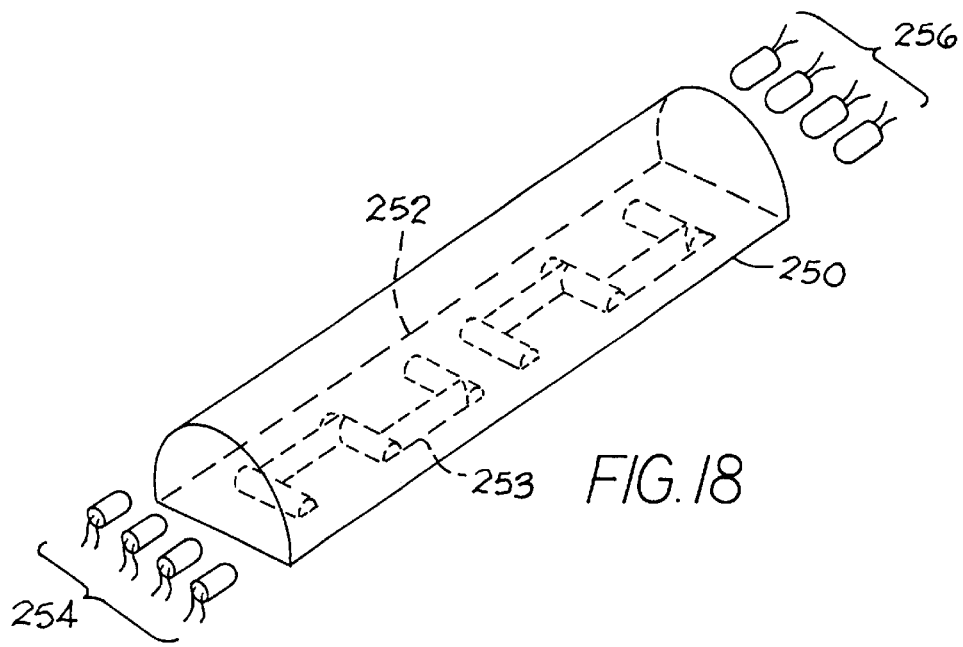
FIG. 18 is a perspective of yet another embodiment of the present invention showing signage where the indicia is in the form of embossed characters in the waveguide itself.

Still another application of the illumination device of the present invention may be seen in FIG. 18. A light pipe 250 is provided with a flat side 252 into which characters, shown tS generally by the numeral 253, may be etched or embossed. Various techniques may be used to emboss the material of the light pipe 250 such as a laser, through mechanical milling, or the use of any hot instrument for removing the material of the light pipe within the surface region to form the characters. It is desirable the flat side 252 to be initially treated so as to have light altering characteristics as discussed above to cause the light fired into the ends of the light pipe 250 to be reflected out of the light pipe. Two sets of LEDs 254, 256 are depicted, one at each end of the light pipe 250. (Alternatively, one end of the light pipe 250 could be provided with an internal light reflecting surface and one set of the LEDs replaced.) Following treatment, embossing then can be done to the treated surface to provide for characters 253. Thereafter, the outside surfaces of the embossed characters 253 may covered with a material having a different light altering characteristic than the covering of flat side 252 so that the embossed characters have a more pronounced visual impact. To provide for a further visual impact, the sets of LEDs 254, 256 may be alternative fired so as to flash or fade, thus providing a visual impact that embossed characters 253 are moving back and forth.

Figure 19:
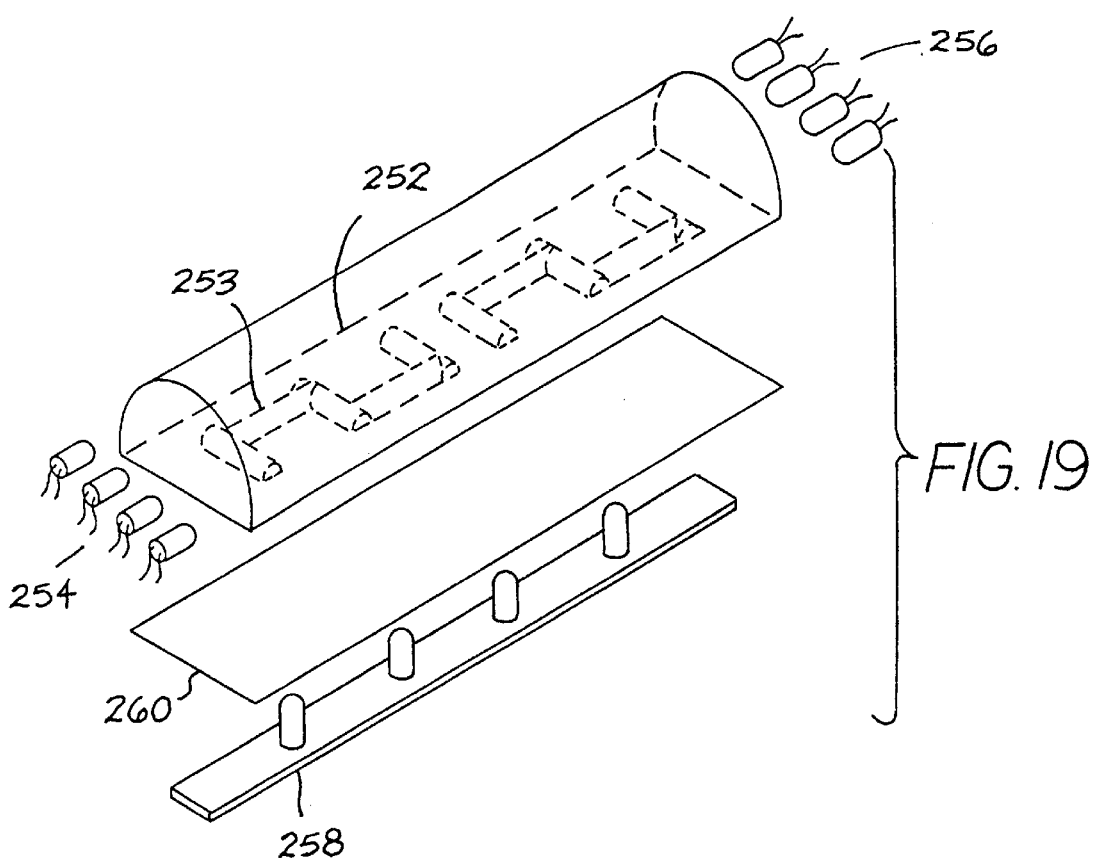
FIG. 19 is a perspective showing a variation of the embodiment of FIG. 18 in which the signage device is directly back lighted through a diffusing member to provide a neon lock to the embossed characters.

FIG. 19 depicts an illumination device that is a variation of that shown in FIG. 18. As illustrated the flat side 252 is directly illuminated by a light source 258 such, as for example, another set of LEDs although any light source of sufficient intensity may be employed as well. The member 260 may be used to more effectively scatter light so as to minimize hot spots, i.e., regions of high light intensity. The light incident upon the embossed indicia is thus made essentially uniform and causes the embossments 253 to glow, providing a neon tubing effect.

Figure 20:
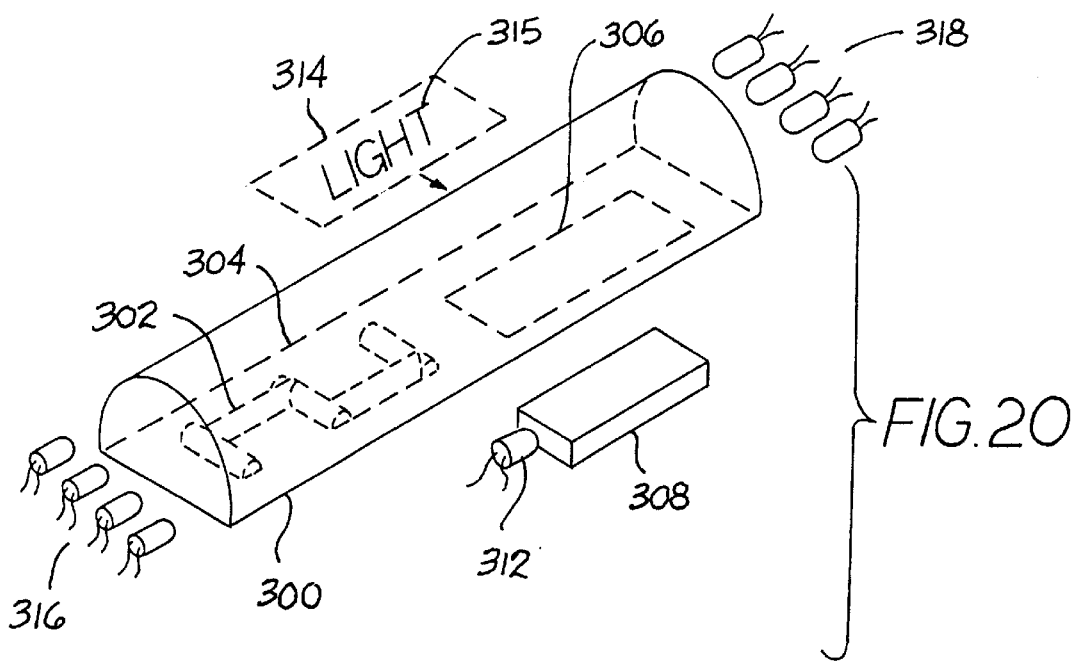
FIG. 20 is still another variation showing a signage device in which the embossed characters are combined with a window area showing indicia readily changeable and back lighting is provided through the use of a second waveguide.
Figure 21A:
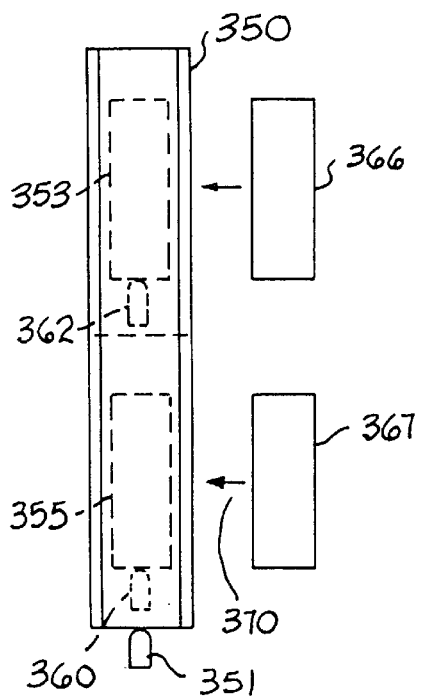
FIGS. 21A, 21B, 21C, and 21D are, respectively, a perspective of a signage showing a plurality of windows such a shown in FIG. 20 without embossed characters, a top view, a front view, and a side view where back lighting is provided with the use of a waveguide.
Figure 21B:
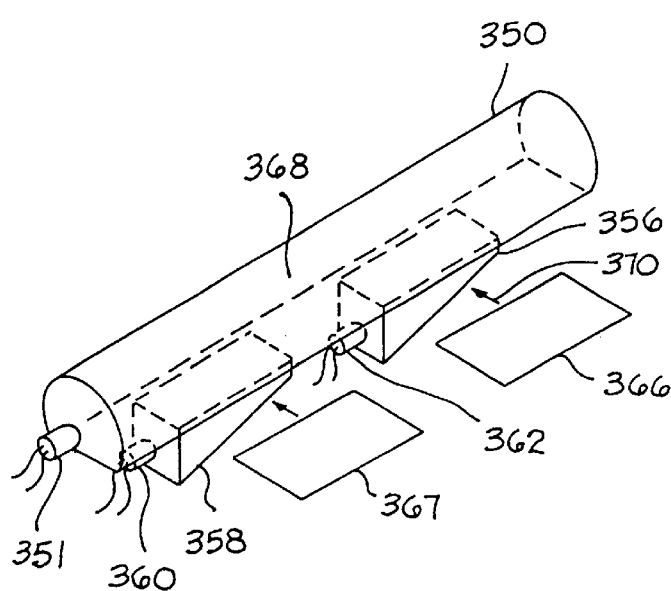
Figure 21C:
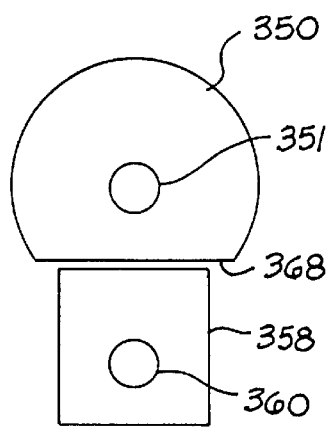
Figure 21D:
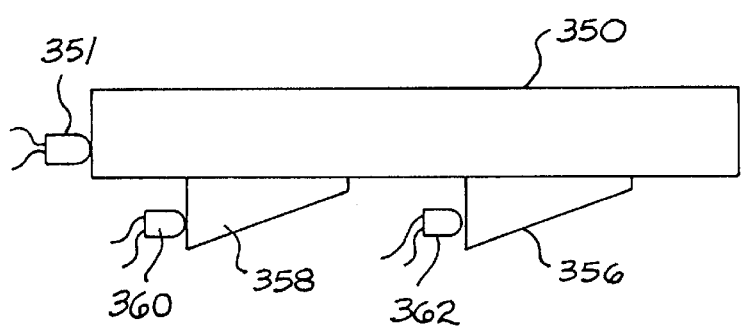
Figure 23A:
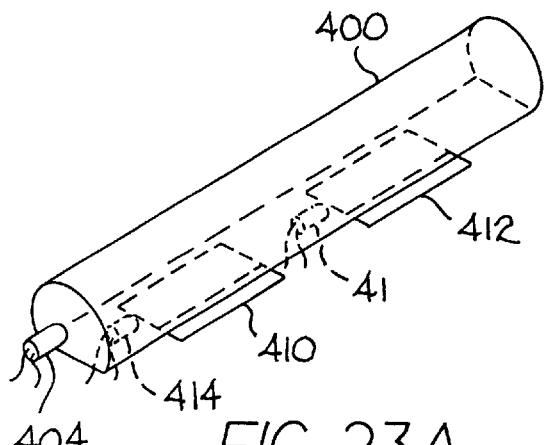
FIGS. 23A, 23B, 23C, and 23D are, respectively, a perspective, top, side, and front view of showing a plurality of windows where back lighting is provided without the use of waveguides.
Figure 23B:
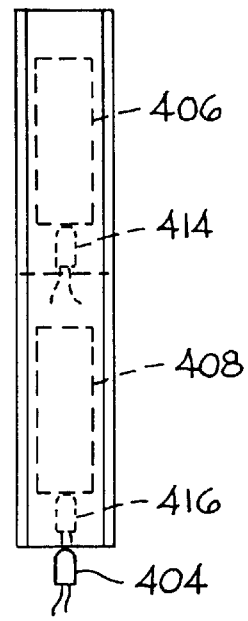
Figure 23C:
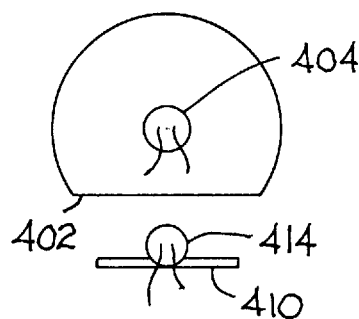
Figure 23D:
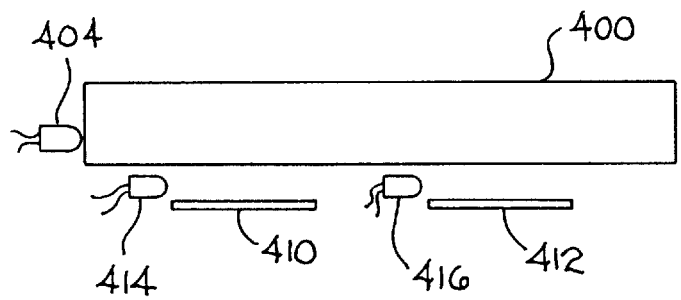

As illustrated in FIG. 20, the desirable effect provided with the embossments can be combined with other indicia that may be changed if desired. As seen in FIG. 20, the light pipe 300 fired at the end surfaces of the by respective sets of LEDs 316, 318 is provided with embossed characters 302 in the manner as described above in a first area on flat side 304. Adjacent to the area containing the embossed characters 302 is a window area 306 shown in dashed lines. Preferably the window area 306 has not be treated in the manner similar to the region about the embossed characters. The window 306 then can be covered with a reflecting tape bearing indicia or some other removable covering such as that shown in FIG. 17 in juxtaposition with the embossed characters 302. Alternatively, the windows made backed by other indicia bearing devices such as liquid crystal displays that are readily changeable. In this manner, the permanent embossing, for example, a well known logo representing the product, resides adjacent the temporary indicia representing, for example, the sales price of the product. Still another alternative structure is depicted by FIG. 20 where direct back lighting may be provided by a back lighting waveguide 308 fired by its own light source represented by LED 310. The additional indicia 315 then can be mounted on a removable film or transparency 314 shown in dashed lines and slid between waveguide 308 and window area 306 and thus viewed adjacent the embossed characters 302. It should be understood that back lighting could be directly accomplished without the use of wave guides or other light directing members when it is unimportant to avoid light spots. Otherwise it may be necessary to use an intermediary diffusing screen as described above.

FIGS. 21A–D show still another variation of the embodiment of FIG. 20 in which a light pipe 350 fired by LED 351 has plurality of separate window areas 353, 355 on flat surface 368 that are back lighted by separate associated light directing members. As perhaps best seen in the perspective of FIG. 21A, a pair of wedge shaped members 356 and 358 are positioned beneath in almost abutting relation ship to the light pipe 350 at the window areas 353 and 355. The hypotenuse sides of the wedge shaped members 356, 358 are light reflecting surfaces which reflect light fired by respective LEDs 360 and 362 upwardly through the films or transparencies 366, 367 bearing certain indicia. The film or transparencies 366, 367 removably slide between the members 356, 358 and the light pipe 350 so as to be located adjacent respective window areas 353, 355. If desired, the areas of the flat surface 368 of the light pipe 350 between or to the side of the window areas 353, 355 may be provided with permanent embossed characters (not shown here) as described above. As indicated schematically by the arrows 370, the films or transparencies 366, 367 can be replaced as desired. As before, it is preferred that all areas of the flat surface outside of the window areas be treated with a material having optically altering characteristics so as to provide a "frame" about the window area. In this manner, the light incident on such areas when reflected out of the light pipe has a different color and/or intensity so as to be contrasted to the signage provided by the light passing through or reflected from the window areas.

Still another variation of the embodiment of FIG. 20 is illustrated by FIGS. 22A–D in which the film or transparencies 366, 367 are back lighted through the use of waveguides 372, 374, positioned closely adjacent to the window area 356, 358. In a manner described above, waveguide 372, side lighted by LED 376, has a lower surface treated to reflect light upwardly into the light pipe 350 and thus through the film 366 removably slid between the upper surface of the waveguide 368 and light pipe 350. As before, although not shown here, embossed characters may be positioned between or to the sides of windows 356, 358.

The FIGS. 23A–D represent still another embodiment of the present invention in which a side lighted wave pipe 400 fired by side positioned LED 404 and having a flat surface 402 treated as before has a pair of window areas 406, 408. Light reflecting members 410, 412 bearing indicia or designs are positioned beneath respective window areas 406, 408 and are illuminated by associated LEDs 414, 416. In this embodiment the LEDs 414, 416 are located between the light pipe 400 and the associated window areas 406, 408 so light is from the LEDs 414, 416 are reflected up through the window areas. Again, the window areas will visually appear to be circumscribed by a contrasting frame due to light reflected upwardly from the treated flat surface 402.

From a reading of the above, it is clear that the various objectives set forth above has been addressed by the description of the invention. It is now clear that a major application for the invention above is the use thereof as an illuminated sign. Such signage has major advantages as being tough, essentially unbreakable, and water resistant. These qualities along with its low energy consumption and heat output permits the signage device to be used in environments where neon lighting has little application. Such signage has virtually unlimited length due to the flexible way in which segments can be joined with little visual evidence of where the segments are joined. In one particularly advantageous embodiment employing embossed characters, the signage can be back lighted to provide for a neon-like appearance to the characters. The lighting quality can easily be modified through appropriate selection of colors for the LEDs or optical treatment of the surfaces of the waveguides or providing alternate fading and intensifying the LEDs fired into the waveguides. The low voltage requirements facilitate the use of batteries as a source of electrical energy thus providing independence from electrical outlets and expanding the application thereof to almost any location for the signage. Many other modifications and variations will become apparent to those with ordinary skill in the art without departing from the spirit and scope of the appended claims.

What is claimed is:

1. A device for displaying illuminated indicia comprising an optical waveguide having an end surface and a predetermined length along which light entering said waveguide through said end surface is directed, said waveguide having a first surface area provided with a first set of indicia located intermediate said predetermined length, said indicia having an optically altered state causing a portion of the light incident thereon to be reflected out through a second surface area of said waveguide located intermediate said length thereby rendering said indicia visible to a viewer.

2. The device of claim 1 including a LED light source positioned adjacent said end surface.

3. The device of claim 2 wherein said waveguide has a second end surface that reflects light incident thereon back along said predetermined length of said waveguide.

4. The device of claim 1 including a second LED light source positioned adjacent a second end surface positioned at the opposite end of said waveguide from said first end surface.

5. The device of claim 1 in which said first set of indicia are characters embossed into said first surface area.

6. The device of claim 2 in which said embossed indicia has a first optically altering state causing a portion of said light incident thereon to be reflected out though said second surface area and a remainder of said first surface about said embossed indicia has a second optically altering state causing a portion of said light incident thereon to be reflected out through said second surface area thereby presenting an optically different background about said indicia to a viewer.

7. The device of claim 2 including a light source positioned adjacent said first surface area for illuminating said embossed indicia thereby providing a neon-like glow to said embossed indicia.

8. The device of claim 1 in which said waveguide includes a third surface area juxtaposed to said first surface area, said device further including a member bearing a second set of indicia positioned adjacent said third surface area and a light source illuminating said second set of indicia so as to be visible along with said first set of indicia.

9. An illumination device comprising:

an optical waveguide of predetermined length, a first housing enclosing one end of said optical waveguide, having at least one high intensity light emitting diode (LED) positioned within said housing and emitting light into said end of the waveguide, a reflecting member extending substantially the length of a waveguide with an open area juxtaposed to said flat wall causing the light to be directionally reflected out of the waveguide, and at least a portion of the surface area of said waveguide being optically treated so as to have light altering characteristics and causing a portion of said light traversing said waveguide to be reflected out of said waveguide through a second surface area located intermediate the length of the waveguide, said waveguide being rotatable relative to said housing so as to change the direction of the light reflected through the second area, and an indicia positioned adjacent to said waveguide in a region to be illuminated by said LED.

10. An illumination device comprising:

an optical waveguide of predetermined length having a V-shaped notch defined by two inclining walls intermediate to each other at one end and opposite ends converging into a substantially flat wall arranged essentially parallel to a longitudinal axis of said waveguide, a first housing for enclosing one end of said optical waveguide having at least one high intensity light emitting diode (LED) positioned within said housing and emitting light into said end of the waveguide, a second housing for enclosing an opposite end of said waveguide having at least one second high intensity LED positioned within said housing and emitting light into said opposite end of said waveguide, a reflecting member extending substantially the length of said waveguide with an open area juxtaposed to said flat wall causing the light to be directionally reflected out of the waveguide, at least one third LED positioned adjacent said flat wall and said open area defined by said reflecting member for causing light to be emitted upward through said flat wall in a direction similar to light reflected by said reflecting member thereby reducing attenuation of traversely emitting light occurring intermediate said one and opposite ends of said optical waveguide and masking said V-shape notch, and at least a portion of the surface area of said waveguide being optically treated so as to have light altering characteristics and causing a portion of said light traversing said waveguide to be reflected out of said waveguide through a second surface area located intermediate the length of the waveguide, said waveguide being rotatable relative to said housing so as to change the direction of the light reflected through the second area.

11. The device of claim 10 in which said inclining walls have treated internal surfaces to reflect light back along said waveguide in a direction away from said surfaces and permitting the transmission of a portion of light from the LED positioned adjacent said flat wall in a direction out of said waveguide similar to light reflected by said reflecting member thereby reducing attenuation of traversely emitting light occurring intermediate said one and opposite ends of said optical waveguide and masking said V-shape notch.

12. An illumination device comprising:
a first optical waveguide of predetermined length with a first reflecting member extending substantially the length of said waveguides causing the light to be directionally reflected out of the first waveguide,
a second optical waveguide of predetermined length with a second reflecting member extending substantially the length of said waveguides causing the light to be directionally reflected out of the second waveguide similar to the light directionally reflected out of the first waveguide, and
a housing for enclosing one end of said first optical waveguide, having at least one first high intensity LED positioned within said housing and emitting light into said end of the first waveguide, and for enclosing one end of said second optical waveguide, having at least one second high intensity LED positioned within said housing and emitting light into said end of the second waveguide, said housing having at least a portion thereof which permits light to be transmitted out of the housing in a direction similar to that caused by the first and second reflecting members so as to reduce the appearance of a light attenuated region between said first and second waveguides.

13. The device of claim 12 including at least one LED positioned between said first and said second LEDs for increasing the intensity of light transmitted out of said housing.

14. A method of fabricating an illuminating device comprising the steps of
providing an optical waveguide with a pair of end surfaces and flattening a portion of said waveguide to form an essentially flat surface from one end surface to the other end surface
optically altering said flat surface so that some light incident upon said flat surface is reflected out of said waveguide through a surface area of said waveguide positioned between said end surfaces,
forming embossed characters in said flat surface, and
thereafter optically altering said embossed characters so as to be distinguishable visually from light reflected by said flat surface.

15. The method of claim 14 in which said step of optically altering said flat surface is accomplished by painting said surface with a light reflecting paint and said step of optically altering said embossed characters is accomplished by painting said characters with another and visually distinguishable light reflecting paint.

16. A sign device for providing illuminated indicia viewable between end surfaces of an optical waveguide in which at least one set of LEDs is positioned adjacent one of said end surfaces for directing light into said waveguide through said one end surface, said waveguide having a first and second surface areas positioned between said end surfaces, said first surface area treated so as to reflect a portion of the light incident thereupon with a first set of optical characteristics out through said second surface, said waveguide further having indicia associated with a surface region within said first surface area and having a second set of optical characteristics visually distinguishable from said first set through said second surface.

17. The device of claim 16 in which the indicia is embossed into waveguide within said surface region in which the surface area of said embossed indicia is treated to provide light incident thereon from said one set of LEDs with said second of optical characteristics.

18. The device of claim 16 in which the indicia is on a member positioned close to a window region in said waveguide within said first surface area and illuminated by a light source, said window being essentially transparent to light impinging thereupon thereby allowing a viewer to view the indicia through said second surface.

19. The device of claim 18 in which said member is essentially transparent and positioned between said light source and said window.

20. The device of claim 18 in which said light source illuminates a surface of said member facing said window.

21. The device of claim 17 in which a second set of indicia is on a member positioned close to a window defined by a third surface area adjacent said first surface area, said window being essentially transparent to light impinging thereupon allowing a viewer to view said embossed indicia and said second set of indicia in a side-by-side relationship through said second surface area.

22. The device of claim 17 in which a second set of indicia is on a member positioned close to a window defined by a third surface area adjacent said first surface area and said light source illuminates the surface of said member facing said window thereby allowing a viewer to view said embossed indicia and said second set of indicia in a side-by-side relationship through said second surface area.

23. The device of claim 20 in which said member is essentially transparent and positioned between said light source and said window.

24. The device of claim 16 including a second set of LEDs positioned adjacent the other surface end of said waveguide.

25. An illumination device comprising:
(a) a waveguide rod assembly comprising at least one waveguide rod and means associated with said rod for causing light to be emitted out of a portion of its lateral surface;
(b) an LED juxtaposed adjacent each and of said waveguide rod;
(c) means enclosing each LED and said associated end and causing light emitted from said LED to be directed into said associated end; and
(d) at least one LED positioned adjacent an intermediate point along the length of said waveguide assembly, said assembly having a light diffusing means associated with said one LED for causing light emitted from said one LED to enter into said assembly and be diffused within said assembly before being emitted out of said portion of said lateral surface thereby minimizing attenuation of light along a region of said portion midway between said ends.

26. The device of claim 25 wherein said waveguide rod has an assembly a V-shaped notch defined by two inclining walls intermediate to each other at one end and opposite ends converging into a substantially flat wall arranged essentially parallel to a longitudinal axis.

27. The device of claim 26 wherein said inclining walls have treated internal surfaces to reflect light back along said waveguide rod in a direction away from said surfaces and permitting the transmission of a portion of light from the LED positioned adjacent intermediate point in a direction out of said waveguide similar to light reflected by said light diffusing means thereby reducing attenuation of traversely emitting light occurring intermediate said one and opposite ends of said optical waveguide and masking said V-shape notch.

28. The device of claim 25 wherein said assembly includes at least two waveguide rods juxtaposed to and with said one LED positioned adjacent said juxtaposed ends of said waveguide rods.

\* \* \* \* \*